(12) United States Patent
Ohta

(10) Patent No.: US 10,635,953 B2
(45) Date of Patent: Apr. 28, 2020

(54) CARD FEED-OUT DEVICE

(71) Applicant: NIDEC SANKYO CORPORATION, Suwa-gun, Nagano (JP)

(72) Inventor: Keiji Ohta, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 16/060,224

(22) PCT Filed: Dec. 2, 2016

(86) PCT No.: PCT/JP2016/085844
§ 371 (c)(1),
(2) Date: Jun. 7, 2018

(87) PCT Pub. No.: WO2017/099005
PCT Pub. Date: Jun. 15, 2017

(65) Prior Publication Data
US 2018/0365538 A1    Dec. 20, 2018

(30) Foreign Application Priority Data
Dec. 10, 2015  (JP) .................. 2015-241268

(51) Int. Cl.
*G06K 13/06*    (2006.01)
*G06K 13/103*   (2006.01)

(52) U.S. Cl.
CPC .......... *G06K 13/06* (2013.01); *G06K 13/103* (2013.01)

(58) Field of Classification Search
CPC ..................................... G06K 13/06
USPC ....................... 235/7 R, 439, 475
See application file for complete search history.

(56) References Cited

U.S. PATENT DOCUMENTS

| 6,098,840 A * | 8/2000 | Ito ............... B65H 3/24 221/232 |
| 2011/0127330 A1* | 6/2011 | Watanabe ...... G06K 7/10316 235/439 |
| 2019/0012583 A1* | 1/2019 | Ohta ............... G06K 13/06 |

FOREIGN PATENT DOCUMENTS

| JP | 2005092776 A | 4/2005 |
| JP | 2007076891 A | 3/2007 |
| JP | 2008191916 A | 8/2008 |
| JP | 2013077232 A | 4/2013 |

(Continued)

OTHER PUBLICATIONS

International Search Report corresponding to Application No. PCT/JP2016/085844; dated Jan. 10, 2017.

*Primary Examiner* — Allyson N Trail
(74) *Attorney, Agent, or Firm* — Cantor Colburn LLP

(57) ABSTRACT

A card feed-out device may include a card housing; a feed-out claw; a claw feed mechanism; a gate member; and a gate moving mechanism. A front opening is formed in a lower end of a front surface of the card housing. A lower opening is formed in a front end of a lower surface portion of the card housing. The gate member may include a front surface and a bottom surface. The gate may be formed between a lower end surface of the front surface and a top surface of the bottom surface. During standby, the gate member is at a retracted position. When the first card is fed out, the gate member moves until at least a part of the bottom surface passes through an upper end of the lower opening, and a lower surface of the gate is disposed above the top surface of the housing bottom surface.

20 Claims, 8 Drawing Sheets

(56) References Cited

FOREIGN PATENT DOCUMENTS

JP   2015161991 A   9/2015

* cited by examiner

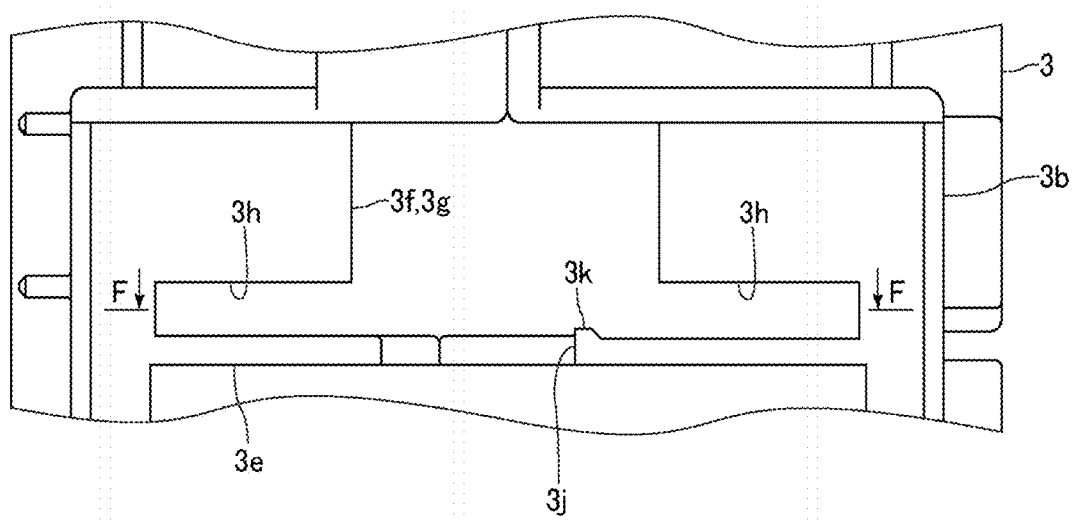
FIG. 5A
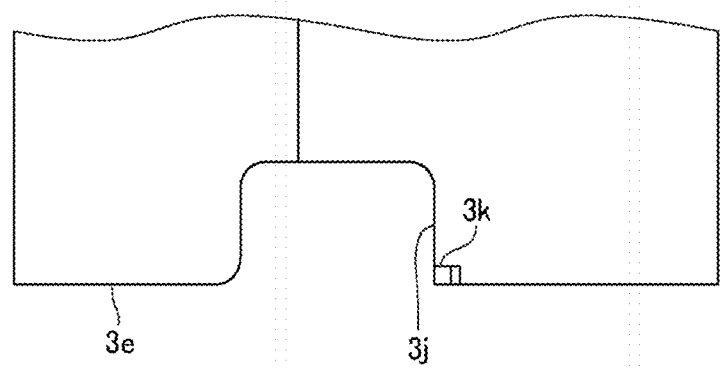
FIG. 5B
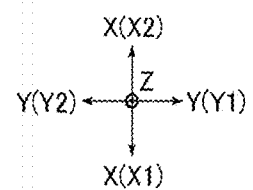

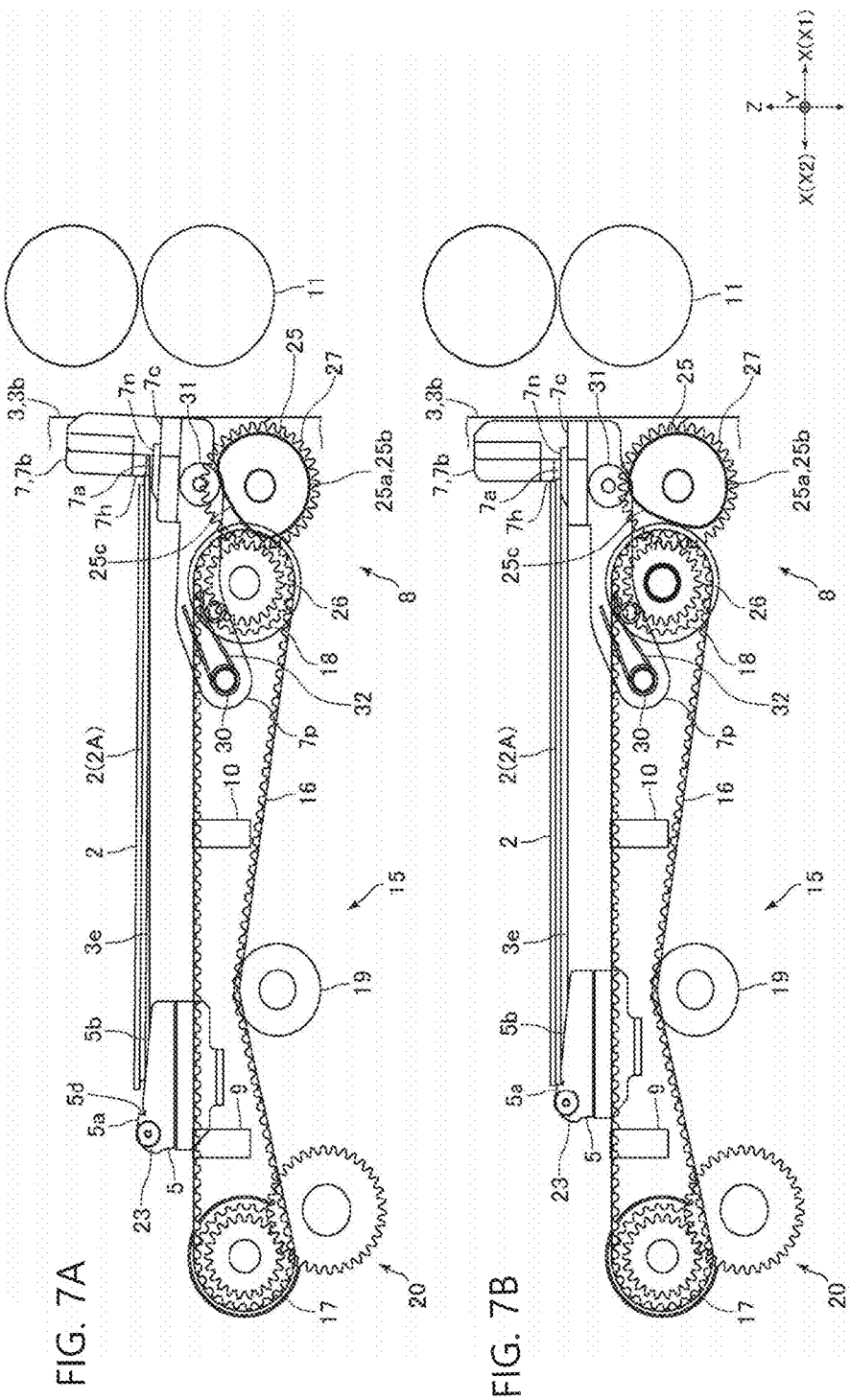

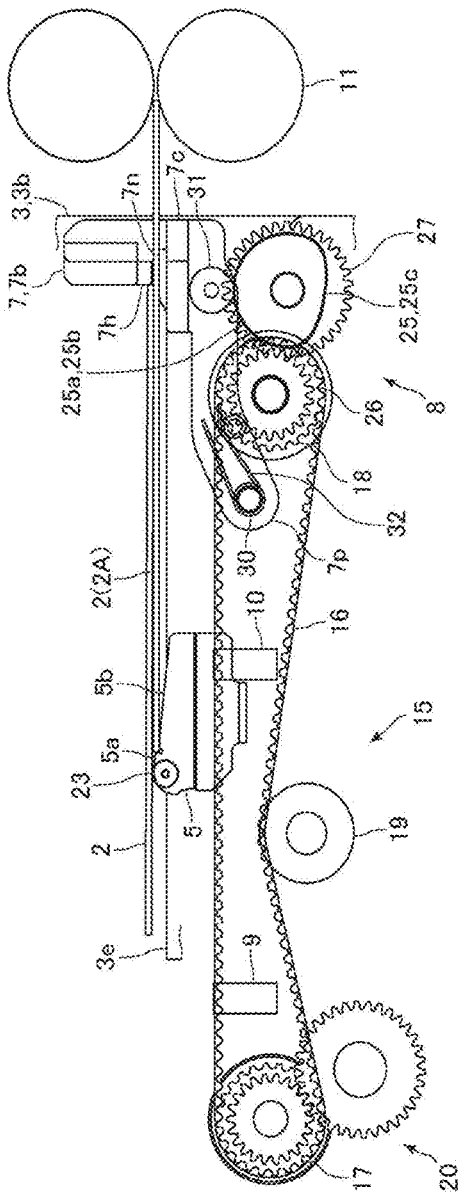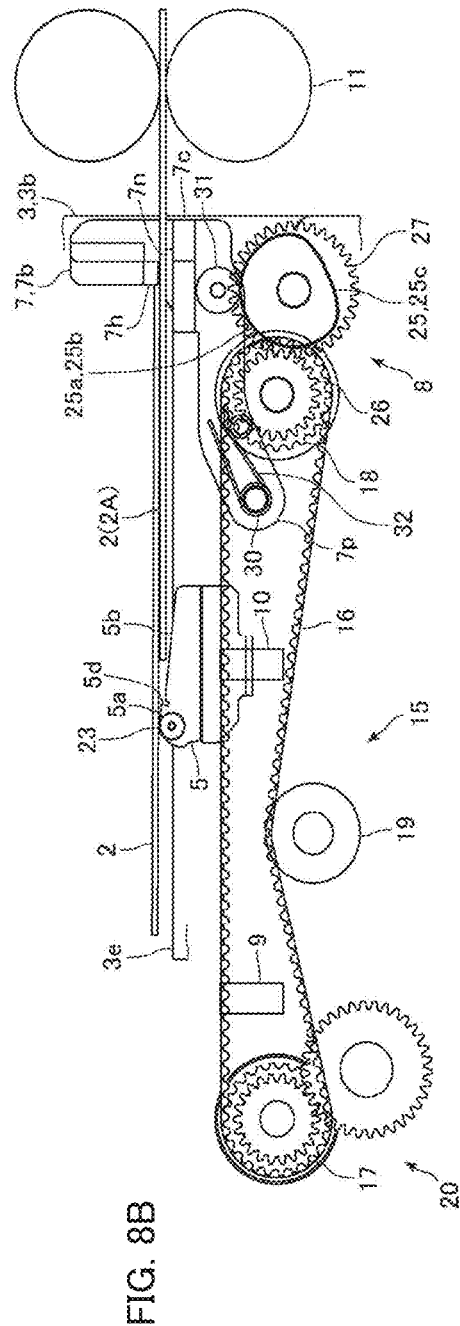

CARD FEED-OUT DEVICE

CROSS REFERENCE TO RELATED APPLICATIONS

This is the U.S. national stage of application No. PCT/JP2016/085844, filed on Dec. 2, 2016. Priority under 35 U.S.C. § 119(a) and 35 U.S.C. § 365(b) is claimed from Japanese Application No. 2015-241268, filed Dec. 10, 2015; the disclosure of which is incorporated herein by reference.

TECHNICAL FIELD

At least an embodiment of the present invention relates to a card feed-out device which feeds out stacked and housed cards one by one.

BACKGROUND

Hitherto, a card feed-out mechanism which feeds out stacked and housed cards one by one has been known (for example, see Patent Literature 1). The card feed-out mechanism disclosed in Patent Literature 1 is provided with a card housing section in which a plurality of cards are stacked and housed, a feed-out claw that engages with a first card that is a card positioned at a bottom of the plurality of cards housed in the card housing section and feeds out the first card to an outside of the card housing section, and a claw feed mechanism that moves the feed-out claw. In a front end portion of the card housing section, a gate through which the first card passes toward a front side is formed.

In the card feed-out mechanism disclosed in Patent Literature 1, an inclined surface that is inclined toward an upper side as getting closer to the front side and guides a front end of the first card to the gate is formed in a front end portion of a bottom surface of the card housing section, that a bottom surface of a first card comes in contact with. Therefore, in this card feed-out mechanism, even when the first card is deformed in the longitudinal direction so as to be convex downward, the front end of the first card fed out by the feed-out claw can be guided to the gate, and as a result, the card deformed in the longitudinal direction so as to be convex downward can be fed out from the gate one by one.

CITATION LIST

[Patent Literature 1] JP 2015-161991 A

In the card feed-out mechanism disclosed in Patent Literature 1, an inclined surface that is inclined toward the upper side as getting closer to the front side is formed in the front end portion of the bottom surface of the card housing section, that the bottom surface of the first card comes in contact with, and a front end side of the first card housed in the card housing section is placed on the inclined surface at all times. Therefore, in this card feed-out mechanism, if the card is housed in the card housing section for an extended period of time, there is a risk that the flat card housed in the card housing section could be deformed in the longitudinal direction so as to be convex downward under the influence of the inclined surface.

SUMMARY

Accordingly, at least an embodiment of the present invention provides a card feed-out device that can feed out the card deformed in the longitudinal direction so as to be convex downward one by one and can prevent the card housed in the card housing section from being deformed even when the card is housed for an extended period of time.

In order to solve the abovementioned problem, the card feed-out device of at least an embodiment of the present invention comprises: a card housing section in which a plurality of cards are stacked and housed; a feed-out claw configured to engage with a first card that is a card positioned at a bottom of the plurality of the cards housed in the card housing section and to feed out the first card to an outside of the card housing section; a claw feed mechanism configured to move the feed-out claw; a gate member configured to be formed with a gate through which the first card passes toward a front side, with a side of a direction of feeding out the first card by the feed-out claw as the front side, and a side opposite to the front side as a rear side; and a gate moving mechanism configured to move the gate member in such a manner that the gate goes up and down. In the card feed-out device of at least an embodiment of the present invention, a front side opening configured to open in a front-rear direction is formed in a lower end of a front wall that constitutes a front surface portion of the card housing section; a lower side opening configured to open in an up and down direction is formed in a front end side of a housing section side bottom surface section that constitutes a lower surface portion of the card housing section; the gate member comprises a front surface section configured to be disposed at a front side of the front side opening and a gate member side bottom surface section configured to be disposed below the front surface section; the gate is formed between at least a part of a lower end surface of the front surface section and at least a part of a top surface of the gate member side bottom surface section; during standby before the first card is fed out to the outside of the card housing section, the gate member is at a retracted position at which the top surface of the gate member side bottom surface section is disposed below the top surface of the housing section side bottom surface section; and when the first card is fed out to the outside of the card housing section, the gate member moves until when at least a part of the top surface of the gate member side bottom surface section passes through an upper end of the lower side opening, and when a lower side surface of the gate is disposed above the top surface of the housing section side bottom surface section.

In the card feed-out device of at least an embodiment of the present invention, during standby before the first card that is positioned at the bottom of the plurality of cards housed in the card housing section is fed out to the outside of the card housing section, the gate member is at the retracted position at which the top surface of the gate member side bottom surface section is disposed below the top surface of the housing section side bottom surface section. Therefore, in at least an embodiment of the present invention, during standby before the first card is fed out to the outside of the card housing section, the card can be placed on the top surface of the flat housing section side bottom surface section. Consequently, in at least an embodiment of the present invention, even when the card is housed in the card housing section for an extended period of time, deformation of the housed card can be prevented.

In addition, in at least an embodiment of the present invention, when the first card is fed out to the outside of the card housing section, the gate member moves until when the lower side surface of the gate is disposed above the top surface of the housing section side bottom surface section, and thus even when the first card placed on the top surface of the flat housing section side bottom surface section is deformed in the longitudinal direction so as to be convex downward, the front end of the first card fed out by the feed-out claw can be guided to the gate. Therefore, in at least an embodiment of the present invention, the card deformed in the longitudinal direction so as to be convex downward can be fed out from the gate one by one. In addition, in at least an embodiment of the present invention, even if a rise level of the gate at a time of feeding out the first card to the outside of the card housing section is made to be large, deformation of the card housed in the card housing section can be prevented, and thus the rise level of the gate at the time of feeding out the first card can be large. Therefore, in at least an embodiment of the present invention, even when deformation volume of the card deformed in the longitudinal direction so as to be convex downward is large, a card in which this deformation volume is large can be fed out from the gate one by one.

Furthermore, in at least an embodiment of the present invention, when the first card is fed out to the outside of the card housing section, the gate member moves until when at least a part of the top surface of the gate member side bottom surface section passes through the upper end of the lower side opening that is formed in the housing section side bottom surface section on which the plurality of cards are placed, and when the lower side surface of the gate is disposed above the top surface of the housing section side bottom surface section. Therefore, in at least an embodiment of the present invention, in any of cases where the deformation volume of the card deformed in the longitudinal direction so as to be convex downward is small, where the card is deformed so as to be convex upward, and where the card is not deformed in the longitudinal direction and thus is a flat card or the like, the front end side of the first card fed out by the feed-out claw is lifted up by the top surface of the gate member side bottom surface section, and the front end of the first card can be guided to the gate. Therefore, in at least an embodiment of the present invention, these cards can be fed out from the gate one by one.

In at least an embodiment of the present invention, the card feed-out device comprises a holding shaft configured to turnably hold a rear end side of the gate member below the housing section side bottom surface section and a biasing member configured to bias the gate member in a direction toward the retracted position, that is a turning direction of the gate member centering around the holding shaft, and that the claw feed mechanism comprises a motor and a power transmission system configured to transmit power of the motor to the feed-out claw, that the gate moving mechanism comprises a cam member configured to be turned by the power of the motor, that a cam follower configured to come in contact with a cam surface formed in the cam member is attached to, or formed in, the gate member, and that when the first card is fed out to the outside of the card housing section, the gate member interlocks with a movement of the feed-out claw, thereby turning centering around the holding shaft.

According to this configuration, the feed-out claw and the gate member can be moved by a common motor, and thus a configuration of the card feed-out device can be simplified. In addition, according to this configuration, the feed-out claw and the gate member can be moved by the common motor, and thus the movement of the feed-out claw and the movement of the gate member can be securely interlocked without performing complicated control. Therefore, the feed-out claw and the gate member can be moved in such a manner that the front end of the first card securely passes through the gate without performing complicated control.

In at least an embodiment of the present invention, a convex section configured to protrude toward an upper side is formed in a front end side of the top surface of the housing section side bottom surface section, that when the gate member is at the retracted position, an upper side surface of the gate is disposed below an upper end surface of the convex section, and that when the first card is fed out to the outside of the card housing section, the gate member moves until when the lower side surface of the gate is disposed above the upper end surface of the convex section. According to this configuration, when the gate member is at the retracted position, the upper side surface of the gate is disposed below the upper end surface of the convex section, and thus during standby before the first card is fed out to the outside of the card housing section, even if vibration or the like is generated in the card feed-out device, the first card can be prevented from passing through the gate toward the front side, and the front end side of the first card can be prevented from being exposed to the outside of the card housing section.

In at least an embodiment of the present invention, that an engaging surface configured to come in contact with a rear end of the first card and push the first card to the front side and an inclined surface configured to be inclined toward an upper side as getting closer to the rear side in a card feed-out state where the feed-out claw feeds out the first card are formed in the feed-out claw, that the inclined surface is disposed more forward than the engaging surface in the card feed-out state, that when the engaging surface is in contact with the rear end of the first card, the rear end of the top surface of the first card is above an upper end of the engaging surface, and that when the card is fed out, after the inclined surface comes in contact with the rear end side of the first card, and the rear end side of the first card, that comes in contact with the inclined surface, rises up while sliding on the inclined surface, and the rear end of the top surface of the first card reaches substantially a same height as the upper end of the engaging surface, and before a front end of the first card, that is pushed by the engaging surface, reaches the gate, the gate member moves in such a manner that the lower side surface of the gate moves to reach above the upper end surface of the convex section.

Before the rear end of the top surface of the first card reaches substantially a same height as the upper end of the engaging surface, when the lower side surface of the gate moves to reach above the upper end surface of the convex section and a tip side of the first card can pass through the gate, the rear end side of the first card is pushed to the front side by the inclined surface and the front end side of the first card passes through the gate and the card that is positioned above the first card and second from the bottom is pushed to the front side by the engaging surface, and thus there is a risk of a jam of the card at the gate. On the other hand, according to the abovementioned configuration, after the rear end of the top surface of the first card reaches substantially the same height as the upper end of the engaging surface, the lower side surface of the gate moves to reach above the upper end surface of the convex section and the tip side of the first card can pass through the gate, and thus even in the unlikely event that the first card is pushed to the front side by the inclined surface, the front end side of the first card does not pass through the gate until when the rear end of the card second from the bottom becomes a state of being not in contact with the engaging surface. Therefore, even in the unlikely event that the first card is pushed to the front side by the inclined surface, the card second from the bottom can be prevented from being pushed to the front side by the engaging surface, and as a result, a jam of the card at the gate can be prevented. In addition, according to this configuration, when the first card is fed out, before the front end of the first card pushed by the engaging surface reaches the gate, the lower side surface of the gate moves to reach above the upper end surface of the convex section, and the tip side of the first card can pass through the gate, and thus the first card can be prevented from being caught at the gate.

In at least an embodiment of the present invention, an engaging surface configured to come in contact with a rear end of the first card and push the first card to the front side and an inclined surface configured to be inclined toward an upper side as getting closer to the rear side in a card feed-out state where the feed-out claw feeds out the first card are formed in the feed-out claw, that the inclined surface is disposed more forward than the engaging surface in the card feed-out state, and that during standby before the first card is fed out to the outside of the card housing section, a gap is formed between the inclined surface and the first card. According to this configuration, during standby before the first card is fed out to the outside of the card housing section, the rear end side of the card housed in the card housing section can be placed on the top surface of the flat housing section side bottom surface section. Therefore, even when the card is housed in the card housing section for an extended period of time, deformation of the housed card can be securely prevented.

In at least an embodiment of the present invention, an engaging surface configured to come in contact with a rear end of the first card and push the first card to the front side is formed in the feed-out claw, that the feed-out claw rotatably holds a roller, that the roller can rotate with a width direction of the card, that is orthogonal to the front-rear direction and the up and down direction, as an axial direction of a rotation, and that in the card feed-out state where the feed-out claw feeds out the first card, the roller is disposed more rearward than the engaging surface, and an upper end of the roller is disposed above an upper end of the feed-out claw. According to this configuration, when the first card is fed out to the outside of the card housing section, the roller comes in contact with a bottom surface of a card that is positioned above the first card and second from the bottom. Therefore, a scratch is not likely to be generated on a bottom surface of the card second from the bottom.

As can be seen, according to the card feed-out device of at least an embodiment of the present invention, the card deformed in the longitudinal direction so as to be convex downward can be fed out one by one, and even when the card is housed in the card housing section for an extended period of time, deformation of the housed card can be prevented.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIGS. 5A and 5B are views of a lower end side portion of a card housing section shown in shown in FIG. 1, and FIG. 5A is a front view, and FIG. 5B is a view showing a bottom surface section of the card housing section from a F-F direction.

FIGS. 7A and 7B are for illustrating an operation of the card feed-out device shown in FIG. 1, and FIG. 7A is a view showing a state when a rear end side of a first card rises up while sliding on an inclined surface of a feed-out claw, and FIG. 7B is a view showing a state when the rear end of the first card starts to be pushed by an engaging surface of the feed-out claw.

FIGS. 8A and 8B are for illustrating the operation of the card feed-out device shown in FIG. 1, and FIG. 8A is a view showing a state when a front end of the first card reaches a transfer roller pair, and FIG. 8B is a view showing a state when the feed-out claw has moved to a movement completion position.

DETAILED DESCRIPTION

Hereinafter, at least an embodiment of the present invention will be described with reference to the drawings.

(Configuration of Card Feed-Out Device)

Figure 1:
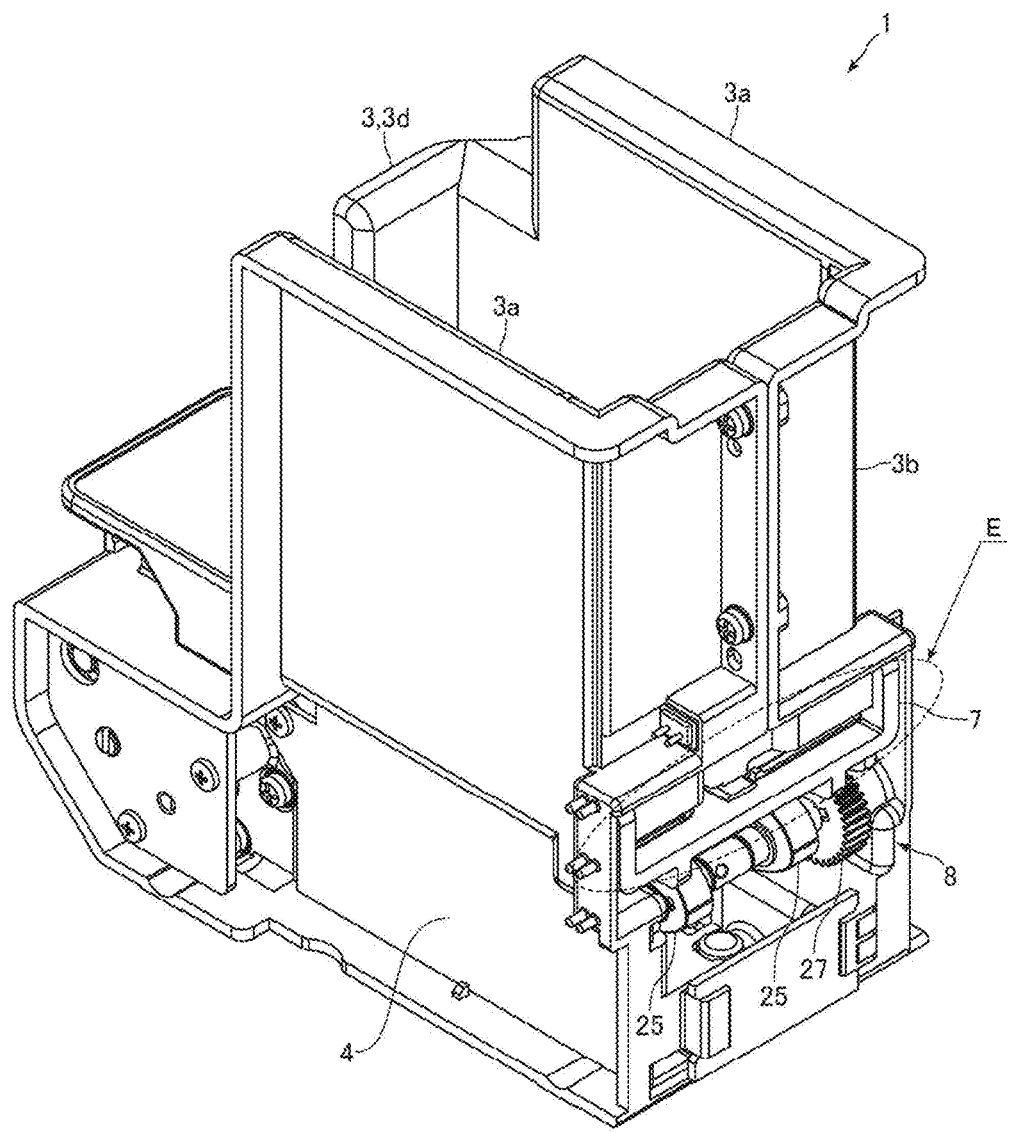
FIG. 1 is a perspective view of a card feed-out device according to the embodiment of the present invention.
Figure 2:
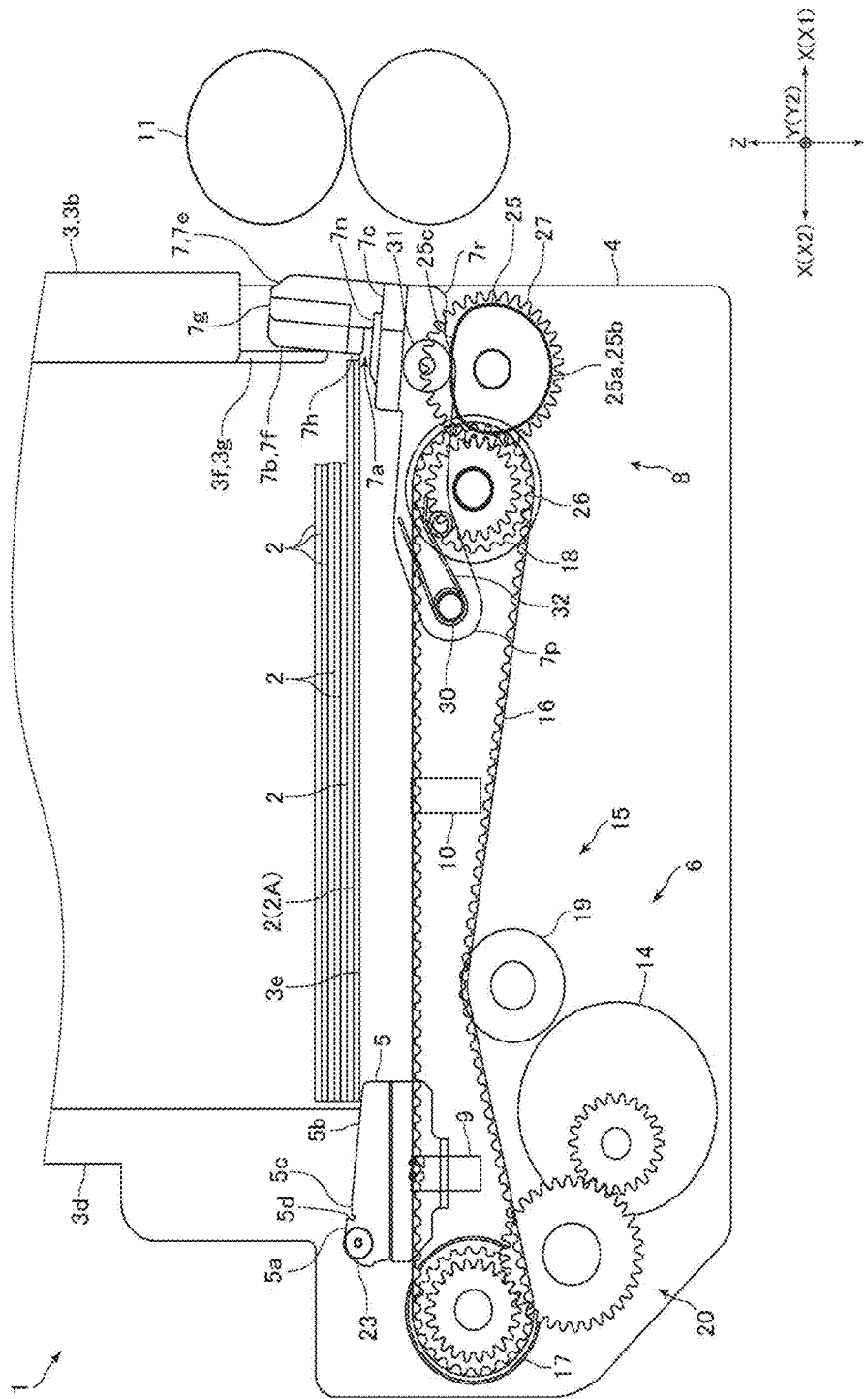
FIG. 2 is a view for illustrating a schematic configuration of a lower end side portion of the card feed-out device shown in FIG. 1 from a side surface.
Figure 3:
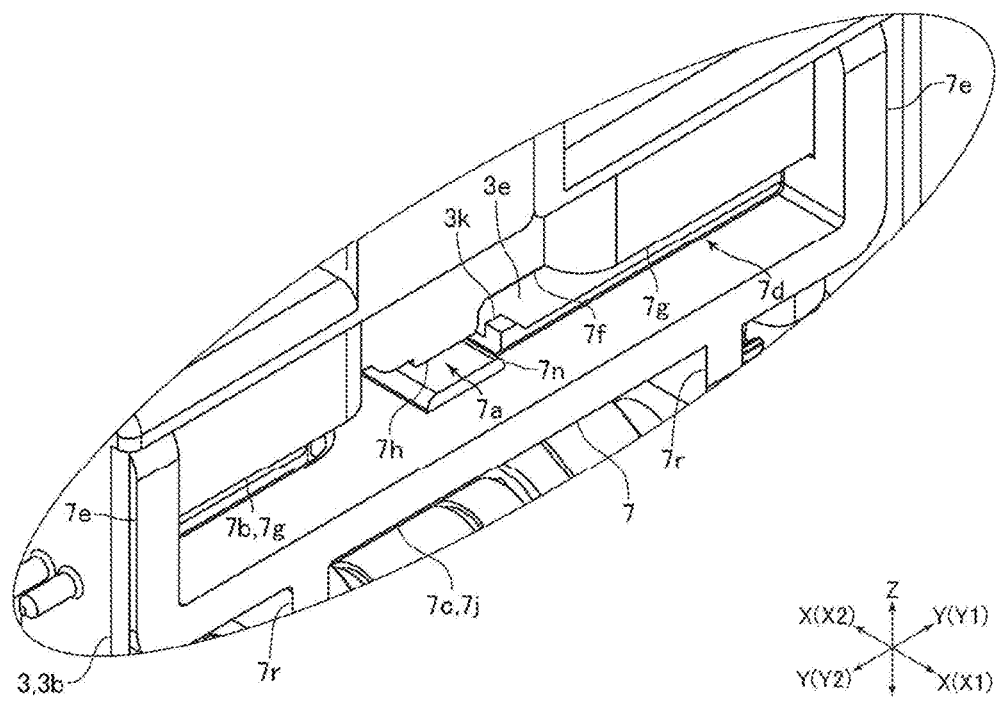
FIG. 3 is an enlarged view of a part E of FIG. 1.
Figure 4A:
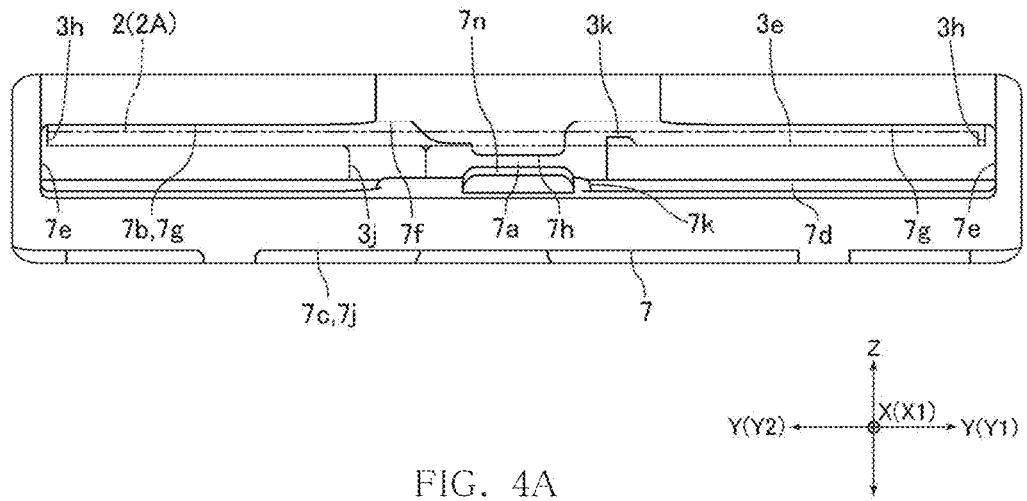
FIGS. 4A and 4B are views for illustrating a configuration of the part E of FIG. 1 from a front.
Figure 4B:
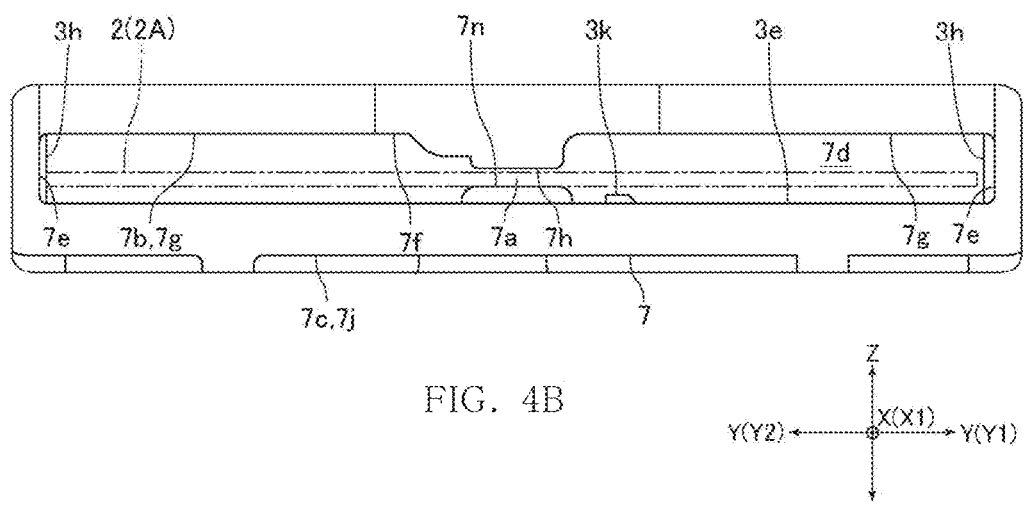
Figure 6:
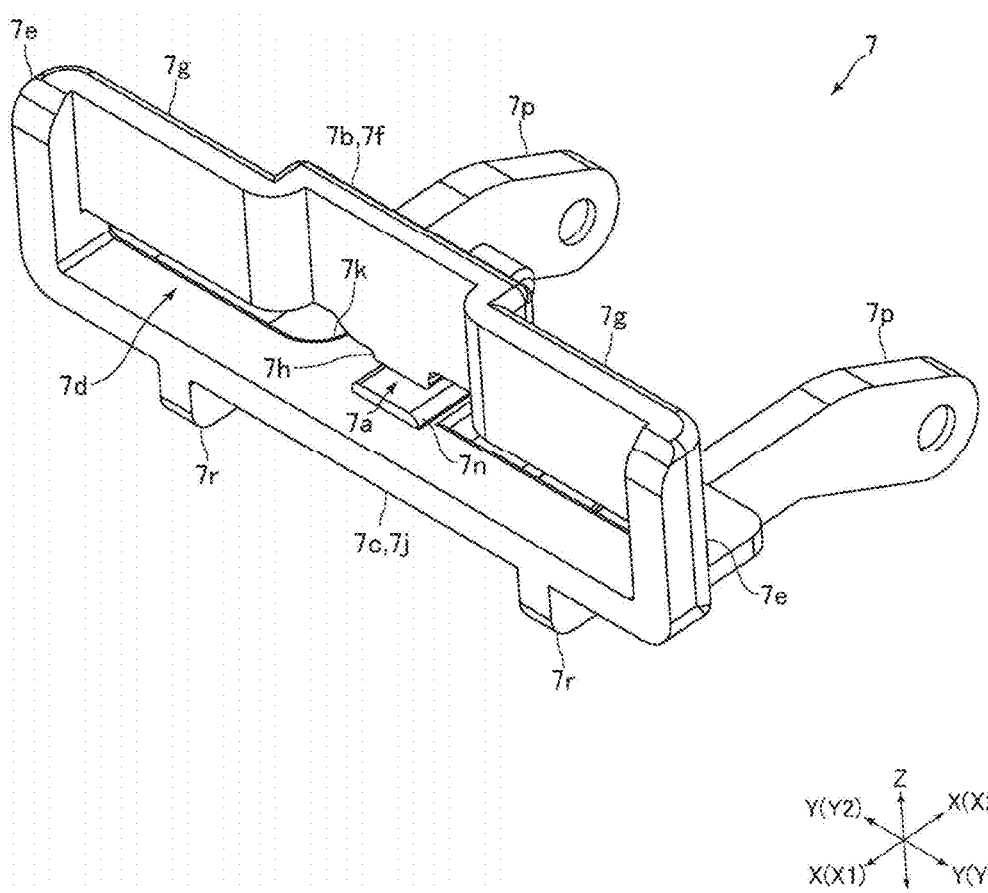
FIG. 6 is a perspective view of a gate member shown in FIG. 1.

FIG. 1 is a perspective view of a card feed-out device 1 according to the embodiment of the present invention. FIG. 2 is a view for illustrating a schematic configuration of a lower end side portion of the card feed-out device 1 shown in FIG. 1 from a side surface. FIG. 3 is an enlarged view of a part E of FIG. 1. FIGS. 4A and 4B are a view for illustrating a configuration of the part E of FIG. 1 from a front. FIGS. 5A and 5B are a view of a lower end side portion of a card housing section 3 shown in FIG. 1, and FIG. 5A is a front view, and FIG. 5B is a view showing a bottom surface section 3e of the card housing section 3 from a F-F direction. FIG. 6 is a perspective view of a gate member 7 shown in FIG. 1.

The card feed-out device 1 of this embodiment is a device for feeding out a card 2 that has been stacked and housed one by one. This card feed-out device 1 is mounted in a card issuing device, together with, and used with, for example, a card reader to perform recording of data in the card 2, a printer to print on the card 2, a card transfer device to transfer the card 2, and the like, and feeds out the card 2 not issued yet one by one toward a card reader, a printer or a card transfer device or the like.

The card 2 is, for example, a rectangular vinyl chloride card having a thickness of about 0.7-0.8 mm. In this card 2, for example, a magnetic stripe in which magnetic data is recorded is formed. In addition, in the card 2, for example, an IC chip is embedded. Incidentally, the card 2 may be a PET (polyethylene terephthalate) card having a thickness of about 0.18-0.36 mm, a paper card having a predetermined thickness, or the like.

In the following description, a vertical direction (Z direction of FIG. 1, etc.) is used as an up and down direction, an X direction of FIG. 1 or the like orthogonal to the up and down direction is used as a front-rear direction, a Y direction of FIG. 1 or the like orthogonal to the up and down direction and the front-rear direction is used as a right and left direction. In addition, an X1 direction side in the front-rear direction is used as "front" side, an X2 direction side that is an opposite side thereof is used as "rear (back)" side, a Y1 direction side in the right and left direction is used as "right" side, a Y2 direction side that is an opposite side thereof is used as "left" side. In this embodiment, the up and down direction coincides with a thickness direction of the card 2 housed in an after-mentioned card housing section 3, the right and left direction coincides with a width direction (lateral direction) of the card 2 housed in the card housing section 3, and the front-rear direction coincides with a length direction of (longitudinal direction) of the card 2 housed in the card housing section 3.

The card feed-out device 1 is provided with a card housing section 3 in which a plurality of cards 2 are stacked and housed, a supporting section 4 that supports the card housing section 3 from a lower side, a feed-out claw 5 that engages with a card 2 (hereinafter, this card 2 is referred to as "first card 2A") positioned at a bottom of a plurality of cards 2 housed in the card housing section 3, and feeds out the first card 2A to an outside of the card housing section 3, and a claw feed mechanism 6 that moves the feed-out claw 5. In this embodiment, the first card 2A is fed out to the front side (X1 direction side) from the card housing section 3 by the feed-out claw 5. That is, the front side is a feed-out direction side of the first card 2A.

In addition, the card feed-out device 1 is provided with a gate member 7 is formed with a gate 7a through which the first card 2A passes toward the front side, a gate moving mechanism 8 that moves the gate member 7 in such a manner that the gate 7a goes up and down, and two sensors 9, 10 for detecting a position of the feed-out claw 5. In addition, a transfer roller pair 11 that transfers the first card 2A fed out from the card feed-out device 1 further toward the front side is disposed at the front side of card feed-out device 1.

The card housing section 3 is composed of a sidewall section 3a that constitutes right and left side surface sections of the card housing section 3, a front wall 3b that constitutes a front surface portion of the card housing section 3, a rear wall 3d that constitutes a rear surface portion of the card housing section 3, and a bottom surface section 3e as a housing section side bottom surface section that constitutes a lower surface portion of the card housing section 3. The card housing section 3 is formed in a box shape and has an open top surface. The plurality of cards 2 are housed in an inside of the card housing section 3 in such a manner that a length direction thereof and the front-rear direction coincide with each other, and a width direction thereof and the right and left direction coincide with each other. In addition, in the inside of the card housing section 3, a weight (not shown in the Figs.) is placed on the plurality of cards 2 that are stacked and housed. This weight is attached to, the sidewall section 3a disposed on a right side, so as to be slidable in the up and down direction.

As shown in FIG. 5A, in a lower end of the front wall 3b, a front side opening 3f that opens in the front-rear direction is formed. The front side opening 3f is composed of a first opening 3g that is formed at a center of the lower end of the front wall 3b, and two second openings 3h that are formed so as to widen outwardly from both of right and left ends at a lower end side of the first opening 3g. The first opening 3g is formed so as to be a substantially square shape when viewed from the front-rear direction, and the second opening 3h is formed so as to be a long rectangular shape in the right and left direction when viewed from the front-rear direction. A width in the right and left direction of a portion of the front side opening 3f, where the second opening 3h is formed, is wider than that in the lateral direction of the card 2. The first card 2A fed out from the card housing section 3 passes through a portion of the front side opening 3f, where the second opening 3h is formed.

In the front end side of the bottom surface section 3e, a lower side opening 3j that opens in the up and down direction is formed. The lower side opening 3j is formed substantially at a center of the bottom surface section 3e in the right and left direction. In addition, the lower side opening 3j is, as shown in FIG. 5B, formed so as to be notched from the front end of the bottom surface section 3e toward a rear side. A shape of the lower side opening 3j when viewed from the up and down direction is substantially rectangular. In addition, in the bottom surface section 3e, a passing groove through which the feed-out claw 5 passes is formed. This passing groove is formed so as to penetrate through the bottom surface section 3e in the up and down direction and is formed in a shape of an elongated slit in the front-rear direction.

The top surface of the bottom surface section 3e is formed in a shape of a flat surface orthogonal to the up and down direction. In the front end side of the top surface of the bottom surface section 3e, a convex section 3k that protrudes toward an upper side is formed. The convex section 3k is formed in a shape of a small block that becomes a shape of a trapezoid when viewed from the front-rear direction. The top surface of the convex section 3k is formed in a shape of a flat surface orthogonal to the up and down direction. The protrusion amount of the convex section 3k from the top surface of the bottom surface section 3e (i.e., a height of the convex section 3k with respect to the top surface of the bottom surface section 3e) is larger than a half of a thickness of the card 2 and smaller than the thickness of the card 2 (see. FIG. 4A). In addition, the convex section 3k is formed at the right side of the lower side opening 3j. The front surface of the convex section 3k is disposed on a flat surface same as a front end surface of the bottom surface section 3e, and the left side of the convex section 3k is disposed on a flat surface same as a right side surface of the lower side opening 3j.

The claw feed mechanism 6 is provided with a motor 14 that becomes a driving source and a power transmission mechanism 15 that transmits power of the motor 14 to the feed-out claw 5. The motor 14 is a geared motor having a reduction gear. The power transmission mechanism 15 is provided with a belt (endless belt) 16 to which the feed-out claw 5 is fixed, a pair of pulleys 17, 18 over which the belt 16 is bridged, a pulley 19 for adjusting tension of the belt 16, and a gear train 20 that transmits the power of the motor 14 to the pulley 17. The pulleys 17-19 and the gear train 20 are rotatably supported in the supporting section 4. In addition, the power transmission mechanism 15 may be provided with a chain and a sprocket as an alternative to the belt 16 and the pulleys 17-19.

The belt 16 and the pulleys 17-19 are disposed below the bottom surface section 3e and are arranged in an inside of the supporting section 4. These belt 16 and pulleys 17-19 are disposed at a substantially central position of the card housing section 3 in the right and left direction. That is, the feed-out claw 5 fixed to the belt 16 is disposed at the substantially central position of the card housing section 3 in the right and left direction. In addition, the pulley 17 is disposed more rearward than the card housing section 3, and the pulley 18 is disposed below the front end side portion of the card housing section 3.

When the pulleys 17, 18 rotate, the feed-out claw 5 reciprocates back and forth between the pulleys 17 and 18 in the front-rear direction. In this embodiment, the feed-out claw 5 reciprocates back and forth between the upper end of the pulley 17 and the upper end of the pulley 18 in the front-rear direction. When the feed-out claw 5 moves between the pulleys 17 and 18, the upper end side of the feed-out claw 5 passes through above the top surface of the bottom surface section 3e of the card housing section 3. When the upper end side of the feed-out claw 5 passes through above the top surface of the bottom surface section 3e toward the front side, the feed-out claw 5 comes in contact with the rear end of the first card 2A and feeds out the first card 2A to the front side.

In addition, in this embodiment, as mentioned above, the feed-out claw 5 reciprocates back and forth between the upper end of the pulley 17 and the upper end of the pulley 18 in the front-rear direction. That is, a portion of the belt 16, where the feed-out claw 5 is fixed, reciprocates back and forth between the upper end of the pulley 17 and the upper end of the pulley 18 and does not move to a position contacting with the pulleys 17, 18. Therefore, in this embodiment, an attitude of the feed-out claw 5 in a card feed-out state where the feed-out claw 5 feeds out the first card 2A and an attitude of the feed-out claw 5 other than the card feed-out state becomes the same. That is, in this embodiment, the attitude of the feed-out claw 5 is always as shown in FIG. 2.

The feed-out claw 5 is formed of a resin material such as polyacetal. In the feed-out claw 5, an engaging section 5a that comes in contact with the rear end of the first card 2A and feeds out the first card 2A is formed. In addition, in the feed-out claw 5, an inclined surface 5b that is inclined toward the upper side as getting closer to the rear side is formed. The inclined surface 5b is formed so as to be disposed more forward than the engaging section 5a. Furthermore, the inclined surface 5b constitutes a front side portion of the upper top of the feed-out claw 5.

Between the inclined surface 5b and the engaging section 5a, a horizontal surface 5c parallel to the horizontal direction is formed. The horizontal surface 5c is formed so as to be connected to a rear end of the inclined surface 5b (i.e., an upper end of the inclined surface 5b). In addition, the engaging section 5a is formed so as to protrude above the horizontal surface 5c, and the front end surface of the engaging section 5a is an engaging surface 5d that comes in contact with the rear end of the first card 2A and pushes the first card 2A to the front side. The engaging section 5a constitutes a rear side portion of the upper end side of the feed-out claw 5. In this embodiment, a distance between the horizontal surface 5c and the upper end of the engaging surface 5d in the up and down direction is slightly shorter than the thickness of the card 2 in such a manner that the engaging surface 5d does not come in contact with two cards 2. Therefore, when the engaging surface 5d is in contact with the rear end of the first card 2A, a rear end of the top surface of the first card 2A is located above the upper end of the engaging surface 5d.

A front end of the inclined surface 5b is disposed slightly below the top surface of the bottom surface section 3e. The horizontal surface 5c (i.e., the rear end of the inclined surface 5b) is disposed above the top surface of the bottom surface section 3e. In addition, the inclined surface 5b is disposed at a position contacting with the rear end side of the first card 2A when the feed-out claw 5 moves toward the front side. In this embodiment, during standby before the first card 2A is fed out to the outside of the card housing section 3, a slight gap is formed between the inclined surface 5b and the first card 2A.

In addition, an inclination angle of the inclined surface 5b with respect to the horizontal direction is set to be an angle at which the rear end side of the first card 2A that comes in contact with the inclined surface 5b slides on the inclined surface 5b. Therefore, when the feed-out claw 5 moves toward the front side, the inclined surface 5b comes in contact with the rear end side of the first card 2A to guide the rear end of the first card 2A to the engaging surface 5d. That is, the inclined surface 5b comes in contact with the rear end side of the first card 2A before starting the feed-out of the first card 2A so as to guide the rear end of the first card 2A to the engaging surface 5d.

A roller 23 is rotatably attached to the feed-out claw 5. That is, the feed-out claw 5 rotatably holds the roller 23. The roller 23 is attached to the feed-out claws 5 in such a manner that a rotation with the right and left direction as an axial direction of the rotation is possible. This roller 23 is attached to the rear end side of the top surface of the feed-out claw 5 and disposed more rearward than the engaging surface 5d. An upper end of the roller 23 is disposed above an upper end of the feed-out claw 5.

The sensors 9, 10 are, for example, transmission type optical sensors in which a light emitting element and a light receiving element are disposed facing each other. These sensors 9, 10 are disposed below the bottom surface section 3e. The sensor 9 is disposed on the rear end side portion of the card feed-out device 1 and plays a function to detect that the feed-out claw 5 is at a predetermined standby position during standby before the first card 2A is fed out to the outside of the card housing section 3. The sensor 10 is disposed at a central portion of the card feed-out device 1 in the front-rear direction. The sensor 10 plays a function to detect that the feed-out claw 5 has been moved to the movement completion position where it is possible to reliably transfer the first card 2A by the transfer roller pair 11. In this embodiment, the feed-out claw 5 reciprocates back and forth between a disposition position of the sensor 9 and a disposition position of the sensor 10.

The gate moving mechanism 8 is provided with a cam member 25 that turns by the power of the motor 14. The cam member 25 is disposed below the bottom surface section 3e. In addition, the cam member 25 is supported by the supporting section 4 in such a manner that a turn with the right and left direction as an axial direction of the turn is possible. An outer peripheral surface of the cam member 25 has a cam surface 25a. The cam surface 25a is composed of a large diameter cam surface 25b and a small diameter cam surface 25c an outer diameter of which is smaller than that of the large diameter cam surface 25b. In this embodiment, two cam members 25 are disposed at a predetermined interval in the right and left direction (see FIG. 1).

In addition, the gate movement mechanism 8 is provided with a gear 26 that is disposed coaxially with and rotates together with the pulley 18, and a gear 27 that is disposed coaxially with and rotates together with the cam member 25. The gear 26 and the gear 27 mesh with each other. The power of the motor 14 is transmitted to the cam member 25 through the power transmission mechanism 15 and the gears 26, 27.

The gate member 7 is provided with a front surface section 7b that is disposed at a front side of the front side opening 3f of the card housing section 3 and a bottom surface section 7c as a gate member side bottom surface section that is disposed below the front surface section 7b. An opening 7d that opens in the front-rear direction is formed between the lower end of the front surface section 7b and the top surface of the bottom surface section 7c. The opening 7d is formed in a shape of an elongated slit in the right and left direction. A width in the right and left direction of the opening 7d is wider than that in the lateral direction of the card 2. The front surface section 7b and the bottom surface section 7c are connected through a connection that constitutes both of right and left ends of the gate member 7.

The front surface section 7b is composed of a plate-like first front surface section 7f that is disposed at a center of the front surface section 7b in the right and left direction, and plate-like two second front surface sections 7g that widen outwardly in the right and left direction from both of right and left ends of the first front surface section 7f. This front surface section 7b is disposed in such a manner that a thickness direction and a front-rear direction of the first front surface section 7f and the second front surface sections 7g substantially coincide with each other. The first front surface section 7f is disposed more rearward than the second front surface section 7g, a front surface of the first front surface section 7f is disposed more rearward than a front surface of the second front surface section 7g, and a back surface of the first front surface section 7f is disposed more rearward than a back surface of the second front surface section 7g.

In the right and left direction, the first front surface section 7f is disposed at the same position as the first opening 3g that is formed in the front wall 3b of the card housing section 3. The width in the right and left direction of the first front surface section 7f is narrower than that in the right and left direction of the first opening 3g. A protrusion 7h that protrudes downward is formed in a central portion in the right and left direction of the lower end surface of the first front surface section 7f. The lower surface of the protrusion 7h is formed in a planar shape that is substantially orthogonal to the up and down direction and constitutes a part of the lower end surface of the front surface section 7b.

The bottom surface section 7c is composed of a bottom surface front portion 7j formed in a substantially flat plate shape of an elongated rectangle in the right and left direction, and a substantially flat plate-shaped projection 7k (see FIG. 6) that projects toward the rear side from the bottom surface front portion 7j. The bottom surface section 7c is disposed in such a manner that a thickness direction and an up and down direction of the bottom surface front portion 7j and the projection 7k substantially coincide with each other. The projection 7k projects toward the rear side from the central portion of the bottom surface front portion 7j in the right and left direction. The projection 7k is formed in a substantially flat plate shape of a rectangle. The bottom surface front portion 7j is disposed at a front side of the bottom surface section 3e of the card housing section 3 when viewed from the up and down direction. The projection 7k is disposed at a same position as the lower side opening 3j formed in the bottom surface section 3e in the right and left direction. A width in the right and left direction of the projection 7k is narrower than that in the right and left direction of the lower side opening 3j.

In the top surface of the bottom surface section 7c, a convex section 7n that projects toward the upper side is formed. The convex section 7n is formed in a flat substantially rectangular parallelepiped shape. This convex section 7n is formed in a range of from a rear end side of the top surface of the bottom surface front portion 7j to a rear side of the top surface of the projection 7k. In addition, a majority portion of the convex section 7n is formed in the top surface of the projection 7k. The top surface of the convex section 7n is formed in a planar shape that is substantially orthogonal to the up and down direction and constitutes a part of the top surface of the bottom surface section 7c. A front surface of the convex section 7n is formed in a planar shape that is orthogonal to the front-rear direction, and the back surface of the convex section 7n is formed in a planar shape or a curved surface shape that is inclined toward the lower side as getting closer to the rear side. Furthermore, right and left side surfaces of the convex section 7n are formed in a planar shape or a curved surface shape that is inclined toward the lower side as getting closer to the outside of the right and left.

The protrusion 7h and the convex section 7n are disposed at a same position in the right and left direction, and the lower end surface of the protrusion 7h and the top surface of the convex section 7n are disposed facing each other with a predetermined gap therebetween. In this embodiment, a portion between the lower end surface of the protrusion 7h and the top surface of the convex section 7n becomes the gate 7a. That is, the gate 7a is formed between, the lower end surface of the protrusion 7h, that becomes a part of the lower end surface of the front surface section 7b, and the top surface of the convex section 7n, that becomes a part of the top surface of the bottom surface section 7c. The gap in the up and down direction of the gate 7a is set in such a manner that one card 2 can pass therethrough, while overlapped two cards 2 cannot pass therethrough. In addition, in this embodiment, a width of the convex section 7n in the front-rear direction is wider than that of the protrusion 7h in the front-rear direction, and a portion between a part of the top surface of the convex section 7n and the lower end surface of the protrusion 7h becomes the gate 7a.

The gate member 7 is turnably held at a holding shaft 30 that is fixed to the supporting section 4 with the right and left direction as an axial direction. Two held portions 7p held by the holding shaft 30 are formed in the gate member 7. The two held portions 7p are disposed at a predetermined interval in the right and left direction. In addition, the held portions 7p are formed so as to extend toward the rear side from the rear end side of the lower surface of the bottom surface section 7c. The rear end side portions of the held portions 7p are turnably held by the holding shaft 30. That is, the rear end side of the gate member 7 is turnably held by the holding shaft 30 below the bottom surface section 3e of the card housing section 3.

A cam follower 31 that comes in contact with the cam surface 25a of the cam member 25 is attached to the gate member 7. In this embodiment, two cam followers 31 that come in contact with the respective cam surfaces 25a of the two cam members 25 are attached to the gate member 7. In addition, the cam follower 31 of this embodiment is a roller, and the gate member 7 is provided with two follower holding sections 7r that rotatably hold the cam follower 31. The two follower holding sections 7r are formed at a predetermined interval in the right and left direction. Moreover, the follower holding sections 7r are formed in a plate shape that protrudes downward from the lower surface of the bottom surface section 7c.

The cam follower 31 is supported at the follower holding sections 7r via a fixed shaft that is fixed to the two follower holding sections 7r in such a manner that a rotation with the right and left direction as an axial direction of the rotation is possible. This cam follower 31 is disposed below the bottom surface section 7c. A center of the cam follower 31 is disposed at a side slightly rearer than the first front surface section 7f in the front-rear direction. In addition, the cam follower 31 is in contact with the cam surface 25a from directly above.

The gate member 7 is biased toward a turning direction centering around the holding shaft 30 by a torsion coil spring 32 as a biasing member. In particular, the gate member 7 is biased in a clockwise direction of FIG. 2 (clockwise) centering around the holding shaft 30 by the torsion coil spring 32. That is, the front end side of the gate member 7 is biased downward by biasing force of the torsion coil spring 32, and the gate member 7 is biased toward an after-mentioned retracted position. The cam follower 31 is pressed against the cam surface 25a by the biasing force of the torsion coil spring 32. The holding shaft 30 is inserted into the torsion coil spring 32.

(Operation of Card Feed-Out Device)

FIGS. 7A and 7B are a view for illustrating an operation of the card feed-out device 1 shown in FIG. 1, (A), and (A) is a view showing a state when a rear end side of a first card 2A rises up while sliding on an inclined surface 5b of a feed-out claw 5, and (B) is a view showing a state when the rear end of the first card 2A starts to be pushed by the engaging surface 5d of the feed-out claw 5. FIGS. 8A and 8B are a view for illustrating the operation of the card feed-out device 1 shown in FIG. 1, and (A) is a view showing a state when a front end of the first card 2A reaches the transfer roller pair 11, and (B) is a view showing a state when the feed-out claw 5 has moved to the movement completion position.

In the card feed-out device 1, during standby before the first card 2A is fed out to the outside of the card housing section 3, as shown in FIG. 2, a majority portion of the feed-out claw 5 except a portion of the front end side of the feed-out claw 5 is disposed more rearward than the rear end of the card 2 that is housed in the card housing section 3, and the feed-out claw 5 is at a predetermined standby position. During that time, the cam member 25 is disposed in such a manner that a center of the small diameter cam surface 25c in the circumferential direction of the cam member 25 is directed right upward, and the front end side of the gate member 7 is at a lower limit position. When the front end side of the gate member 7 is at the lower limit position, the top surface of the bottom surface section 7c of the gate member 7 is disposed below the top surface of the bottom surface section 3e of the card housing section 3. In particular, as shown in FIG. 4A, a whole of the top surface of the bottom surface section 7c, including the top surface of the convex section 7n, is disposed below the top surface of the bottom surface section 3e.

In this embodiment, when the front end side of the gate member 7 is at the lower limit position, the gate member 7 is at a retracted position (a position shown in FIG. 2 and FIG. 4A). That is, during standby before the first card 2A is fed out to the outside of the card housing section 3, the gate member 7 is at the retracted position at which the top surface of the bottom surface section 7c is disposed below the top surface of the bottom surface section 3e. When the gate member 7 is at the retracted position, the lower end surface of the protrusion 7h that becomes the upper side surface of the gate 7a is, disposed below the top surface of the convex section 3k as shown in FIG. 4A. In particular, the lower end surface of the protrusion 7h is disposed below the top surface of the bottom surface section 3e. In addition, at this time, the lower end side of the protrusion 7h is disposed in the lower side opening 3j.

When the first card 2A is fed out to the outside of the card housing section 3, the motor 14 is activated, pulleys 17, 18 rotate in the clockwise direction of FIG. 2, and the feed-out claw 5 at the standby position moves toward the front side. When the feed-out claw 5 moves to the front side, the inclined surface 5b of the feed-out claw 5 comes in contact with the rear end side of the first card 2A, and then, as shown in FIG. 7A, the rear end side of the first card 2A that comes in contact with the inclined surface 5b rises up while sliding on the inclined surface 5b. In addition, when the motor 14 is activated, the cam member 25 turns in the counter-clockwise direction (counterclockwise) of FIG. 2. As the cam member 25 rotates counterclockwise, the gate member 7 turns in the counterclockwise direction of FIG. 2 centering around the holding shaft 30, and the front end side of the gate member 7 gradually rises up. That is, as the cam member 25 rotates counterclockwise, the gate 7a gradually rises up. As stated above, when the first card 2A is fed out, the gate member 7 turns centering around the holding shaft 30, interlocking with the movement of the feed-out claw 5.

Afterwards, when the feed-out claw 5 further moves to the front side, as shown in FIG. 7B, the engaging surface 5d of the feed-out claw 5 comes in contact with the rear end of the first card 2A, and the first card 2A starts to move to the front side. In addition, the cam member 25 further rotates in the counterclockwise direction of FIG. 2, the gate member 7 turns centering around the holding shaft 30 in the counterclockwise direction of FIG. 2, and the front end side of the gate member 7 further rises up. In this embodiment, before the front end of the first card 2A that is pushed by the engaging surface 5d reaches the gate 7a, the gate member 7 turns in such a manner that the top surface of the convex section 7n that becomes the lower side surface of the gate 7a moves to reach above an upper end surface of the convex section 3k of the card housing section 3 (that is, in such a manner that the tip side of the first card 2A can pass through the gate 7a), and the gate 7a rises up.

As shown in FIG. 4B, when the front end side of the gate member 7 rises up to a position at which the top surface of the convex section 7n is disposed above the upper end surface of the convex section 3k, the front end side of the gate member 7 reaches an upper-limit position. The front end side of the gate member 7 reaches the upper-limit position when the cam follower 31 starts to come in contact with the large diameter cam surface 25b of the cam member 25 that turns in the counterclockwise direction of FIG. 2. When the front end side of the gate member 7 is at the upper-limit position, as mentioned above, the top surface of the convex section 7n is disposed above the upper end surface of the convex section 3k, and thus, at this point of time, the top surface of the convex section 7n that becomes the lower side surface of the gate 7a is disposed above the top surface of the bottom surface section 3e of the card housing section 3.

In addition, when the front end side of the gate member 7 is at the upper-limit position, the bottom surface front portion 7j of the bottom surface section 7c is disposed at the front side of the bottom surface section 3e. Moreover, when the front end side of the gate member 7 is at the upper-limit position, as shown in FIG. 4, FIG. 7B and FIG. 8, the top surface of the bottom surface section 7c except the top surface of the convex section 7n is disposed at almost the same position as the top surface of the bottom surface section 3e in the up and down direction. Incidentally, when the front end side of the gate member 7 is at the upper-limit position, the top surface of the bottom surface section 7c except the top surface of the convex section 7n may be disposed above the top surface of the bottom surface section 3e, and the top surface of the bottom surface section 7c except the top surface of the convex section 7n may be disposed below the top surface of the bottom surface section 3e.

When the top surface of the convex section 7n disposed below the top surface of the bottom surface section 3e during standby before the first card 2A is fed out to the outside of the card housing section 3 moves to reach above the top surface of the bottom surface section 3e at the time of feeding out the card 2A, the top surface of the convex section 7n passes through the upper end of the lower side opening 3j of the bottom surface section 3e. As stated above, in this embodiment, at the time of feeding out the first card 2A, the gate member 7 moves until when the top surface of the convex section 7n that becomes a part of the top surface of the bottom surface section 7c passes through the upper end of the lower side opening 3j and the top surface of the convex section 7n that is the lower side surface of the gate 7a is disposed above the top surface of the bottom surface section 3e. In addition, at the time of feeding out the first card 2A, the gate member 7 moves until when the top surface of the convex section 7n that is the lower side surface of the gate 7a is disposed above the upper end surface of the convex section 3k.

Incidentally, in this embodiment, after the rear end of the top surface of the first card 2A reaches substantially the same height as the upper end of the engaging surface 5d of the feed-out claw 5, the gate member 7 turns in such a manner that the top surface of the convex section 7n moves to reach above the upper end surface of the convex section 3k of the card housing section 3, and thus the front end side of the gate member 7 rises up. That is, as shown in FIG. 7A, when the rear end side of the first card 2A is at a middle position on the inclined surface 5b and the rear end of the top surface of the first card 2A has not reached substantially the same height as the upper end of the engaging surface 5d, the top surface of the convex section 7n is below the upper end surface of the convex section 3k, and the tip side of the first card 2A cannot pass through the gate 7a.

In addition, afterwards, the feed-out claw 5 further moves forward, as shown in FIG. 8A, the front end side of the first card 2A that is pushed by the engaging surface 5d passes through the gate 7a, and the first card 2A is fed out to a position at which a tip of the first card 2A is sandwiched between the transfer roller pair 11. In this embodiment, a transfer speed of the first card 2A by the transfer roller pair 11 is faster than a feed-out speed of the first card 2A by the feed-out claw 5. Therefore, when the first card 2A is sandwiched between the transfer roller pair 11, the rear end of the first card 2A moves gradually away from the engaging surface 5d of the feed-out claw 5 (see FIG. 8B).

When the feed-out claw 5 moves to a position at which the tip of the first card 2A is sandwiched between transfer roller pair 11, the feed-out claw 5 has not moved to the movement completion position. Therefore, the feed-out claw 5 further moves to the front side to the movement completion position shown in FIG. 8B and then stops. That is, when the feed-out claw 5 has moved to the movement completion position, the motor 14 stops. After the cam follower 31 starts to come in contact with the large diameter cam surface 25b of the cam member 25, while the feed-out claw 5 moves to the movement completion position, the cam follower 31 is continuously in contact with the large diameter cam surface 25b (see FIG. 7B and FIG. 8). Therefore, while the feed-out claw 5 moves to the movement completion position, a state where the front end side of the gate member 7 is disposed at the upper-limit position is maintained.

Afterwards, when a gate passage sensor (not shown in the Figs.) that is disposed at the substantially same position as the front end side of the gate member 7 in the front-rear direction detects that the rear end of the first card 2A transferred to the transfer roller pair 11 has passed through the gate 7a, the motor 14 gets activated, the pulleys 17, 18 rotate in the counterclockwise direction of FIG. 2, and the feed-out claw 5 moves to the rear side to the standby position.

(Major Effects of this Embodiment)

As described above, in this embodiment, during standby before the first card 2A is fed out to the outside of the card housing section 3, the whole of the top surface of the bottom surface section 7c of the gate member 7 is disposed below the top surface of the bottom surface section 3e of the card housing section 3. In addition, in this embodiment, during standby before the first card 2A is fed out to the outside of the card housing section 3, a slight gap is formed between the inclined surface 5b of the feed-out claw 5 and the first card 2A. Therefore, in this embodiment, during standby before the first card 2A is fed out to the outside of the card housing section 3, a whole of the card 2 can be placed on the top surface of the flat bottom surface section 3e that is formed in a planar shape. Therefore, in this embodiment, even when the card 2 is housed in the card housing section 3 for an extended period of time, deformation of the housed card 2 can be prevented.

In this embodiment, when the first card 2A is fed out to the outside of the card housing section 3, the gate member 7 moves until the top surface of the convex section 7n that is the lower side surface of the gate 7a is disposed above the top surface of the bottom surface section 3e. Therefore, in this embodiment, even if the first card 2A that is placed on the top surface of the flat bottom surface section 3e is deformed in the longitudinal direction so as to be convex downward, the front end of the first card 2A fed out by the feed-out claw 5 can be guided to the gate 7a. Therefore, in this embodiment, the first card 2A that is deformed in the longitudinal direction so as to be convex downward can be fed out from the gate 7a one by one.

In addition, in this embodiment, even if the rise level of the gate 7a at the time of feeding out the first card 2A to the outside of the card housing section 3 is made to be large, the deformation of the card 2 housed in the card housing section 3 can be prevented, and thus the rise level of the gate 7a at the time of feeding out the first card 2A can be large. Therefore, in this embodiment, even if a deformation volume of the first card 2A that is deformed in the longitudinal direction so as to be convex downward is large, the first card 2A in which this deformation volume is large can be fed out from the gate 7a one by one.

In addition, in this embodiment, when the first card 2A is fed out to the outside of the card housing section 3, the gate member 7 moves until when the top surface of the convex section 7n that becomes a part of the top surface of the bottom surface section 7c passes through the upper end of the lower side opening 3j that is formed in the bottom surface section 3e on which the plurality of cards 2 are placed, and when the top surface of the convex section 7n that is the lower side surface of the gate 7a is disposed above the top surface of the bottom surface section 3e. Therefore, in this embodiment, in any of cases where the deformation volume of the first card 2A that is deformed in the longitudinal direction so as to be convex downward is small, where the first card 2A is deformed so as to be convex upward, and where the first card 2A is not deformed in the longitudinal direction and thus is a flat card or the like, the front end side of the first card 2A fed out by the feed-out claw 5 can be lifted up by the top surface of the convex section 7n, and the front end of the first card 2A can be guided to the gate 7a. Therefore, in this embodiment, these first cards 2A can be fed out from the gate 7a one by one.

In this embodiment, the gate member 7 is turned by the motor 14 that moves the feed-out claw 5. Therefore, in this embodiment, compared to a case where a motor that turns the gate member 7 is provided in addition to the motor 14, a configuration of the card feed-out device 1 can be simplified. In addition, in this embodiment, the movement of the feed-out claw 5 and the turning of the gate member 7 are performed by the common motor 14, and thus the movement of the feed-out claw 5 and the movement of the gate member 7 can be securely interlocked without performing complicated control. Therefore, in this embodiment, the feed-out claw 5 and the gate member 7 can be moved in such a manner that the front end of the first card 2A securely passes through the gate 7a without performing complicated control.

In this embodiment, when the gate member 7 is at the retracted position, the lower end surface of the protrusion 7h that becomes the upper side surface of the gate 7a is disposed below the upper end surface of the convex section 3k that is formed in a front end side of a top surface of the bottom surface section 3a. Therefore, in this embodiment, during standby before the first card 2A is fed out to the outside of the card housing section 3, even if vibration or the like is generated in the card feed-out device 1, the first card 2A can be prevented from passing through the gate 7a toward the front side, and the front end side of the first card 2A can be prevented from being exposed to the outside of the card housing section 3.

In this embodiment, the roller 23 is rotatably attached to the feed-out claw 5, the upper end of the roller 23 is disposed above the upper end of the feed-out claw 5. Therefore, in this embodiment, when the first card 2A is fed out to the outside of the card housing section 3, as shown in FIG. 8, the roller 23 comes in contact with a bottom surface of a card 2 that is positioned above the first card 2A and second from the bottom. In addition, after the first card 2A is fed out by the transfer roller pair 11, even when the feed-out claw 5 moves to the rear side from the movement completion position to the standby position, the roller 23 comes in contact with a bottom surface of a next first card 2A. Therefore, in this embodiment, a scratch of the card 2 caused by contact between the feed-out claw 5 and the card 2 can be prevented.

In this embodiment, the feed-out claw 5 is at the movement completion position until when the rear end of the first card 2A that is transferred to the transfer roller pair 11 passes through the gate 7a, and the feed-out claw 5 supports the card 2 housed in the card housing section 3 from below. Therefore, in this embodiment, a transfer load of the first card 2A by the transfer roller pair 11 can be reduced.

Here, before the rear end of the top surface of the first card 2A reaches substantially the same height as the upper end of the engaging surface 5d of the feed-out claw 5, when the top surface of the convex section 7n that becomes the lower side surface of the gate 7a moves to reach above the upper end surface of the convex section 3k of the card housing section 3 and the tip side of the first card 2A can pass through the gate 7a, the rear end side of the first card 2A is pushed to the front side by the inclined surface 5b of the feed-out claw 5 and the front end side of the first card 2A passes through the gate 7a, and the card 2 that is positioned above the first card 2A and second from the bottom is also pushed to the front side by the engaging surface 5d, and thus there is a risk of a jam of the card 2 at the gate 7a.

However, in this embodiment, after the rear end of the top surface of the first card 2A reaches substantially the same height as the upper end of the engaging surface 5d, the front end side of the gate member 7 rises up in such a manner that the top surface of the convex section 7n moves to reach above the upper end surface of the convex section 3k. That is, in this embodiment, after the rear end of the top surface of the first card 2A reaches substantially the same height as the upper end of the engaging surface 5d, the tip side of the first card 2A can pass through the gate 7a. Therefore, in this embodiment, even in the unlikely event that the first card 2A is pushed to the front side by the inclined surface 5b, the front end side of the first card 2A never passes through the gate 7a until when the rear end of the card 2 that is second from the bottom becomes a state of being not in contact with the engaging surface 5d. Therefore, in this embodiment, even in the unlikely event that the first card 2A is pushed to the front side by the inclined surface 5b, the card 2 second from the bottom can be prevented from being pushed to the front side by the engaging surface 5d, and as a result, a jam of the card 2 at the gate 7a can be prevented.

In addition, in this embodiment, before the front end of the first card 2A pushed by the engaging surface 5d reaches the gate 7a, the top surface of the convex section 7n moves to reach above the upper end surface of the convex section 3k, and the tip side of the first card 2A can pass through the gate 7a, and thus the first card 2A can be prevented from being caught at the gate 7a.

Other Embodiment

While the abovementioned embodiment is at least one embodiment of the present invention, the present invention is not limited to this, and various variations can be made without changing the scope of the present invention.

In the abovementioned embodiment, during standby before the first card 2A is fed out to the outside of the card housing section 3, a slight gap is formed between the inclined surface 5b of the feed-out claw 5 and the first card 2A. In addition to this, for example, as long as the rear end side of the housed card 2 is not deformed even when the card 2 is housed in the card housing section 3 for an extended period of time, the inclined surface 5b and the first card 2A may be in contact with each other during standby before the first card 2A is fed out to the outside of the card housing section 3.

In the abovementioned embodiment, after the rear end of the top surface of the first card 2A reaches substantially the same height as the upper end of the engaging surface 5d of the feed-out claw 5, the top surface of the convex section 7n moves to reach above the upper end surface of the convex section 3k. In addition to this, for example, as long as the rear end side of the first card 2A securely slides on the inclined surface 5b of the feed-out claw 5, before the rear end of the top surface of the first card 2A reaches substantially the same height as the upper end of the engaging surface 5d, the top surface of the convex section 7n may move to reach above the upper end surface of the convex section 3k.

In the abovementioned embodiment, while the convex section 7n is formed in the bottom surface section 7c, the convex section 7n may not be formed. In this case, the gate 7a is formed between the lower end surface of the protrusion 7h and the top surface of the bottom surface section 7c. In addition, in the abovementioned embodiment, while the protrusion 7h is formed in the first front surface section 7f, the convex section 7n and the protrusion 7h may not be formed. In this case, the gate 7a is formed between a whole of the lower end surface of the front surface section 7b and a whole of the top surface of the bottom surface section 7c.

In these cases, when the first card 2A is fed out to the outside of the card housing section 3, the gate member 7 moves until when the top surface of the projection 7k that becomes a part of the top surface of the bottom surface section 7c passes through the upper end of the lower side opening 3j, and when the top surface of the bottom surface section 7c that is the lower side surface of the gate 7a is disposed above the top surface of the bottom surface section 3e. In addition, in these cases, at the time of feeding out the card 2A, the lower side opening 3j through which the whole of the top surface of the bottom surface section 7c passes may be formed in the bottom surface section 3e. In addition, while the convex section 7n may be formed, the protrusion 7h may not be formed. In this case, the gate 7a is formed between the lower end surface of the front surface section 7b and the top surface of the convex section 7n.

In the abovementioned embodiment, while the cam follower 31 is a roller, the cam follower 31 may be a member that is formed in a block shape. In this case, the cam follower 31 may be integrally formed with the gate member 7. In addition, in the abovementioned embodiment, while the convex section 3k is formed in the front end side of the bottom surface section 3e of the card housing section 3, the convex section 3k may not be formed in the front end side of the bottom surface section 3e. Moreover, in the abovementioned embodiment, while the gate member 7 is turned by the motor 14 that moves the feed-out claw 5, a motor that turns the gate member 7 may be provided separately in addition to the motor 14.

In the abovementioned embodiment, while the gate member 7 turns centering around the holding shaft 30, the gate member 7 may slide linearly in the up and down direction. In addition, in the abovementioned embodiment, while the biasing member that biases the gate member 7 is the torsion coil spring 32, the biasing member that biases the gate member 7 may be a spring member other than the torsion coil spring 32. Furthermore, in the abovementioned embodiment, while the roller 23 is attached to the feed-out claw 5, the roller 23 may not be attached to the feed-out claw 5. Moreover, in the abovementioned embodiment, while the inclined surface 5b is formed in the feed-out claw 5, the inclined surface 5b may not be formed in the feed-out claw 5.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A card feed-out device for use with a plurality of cards, the card feed-out device comprising:
a card housing section in which the plurality of cards are stacked and housed;
a feed-out claw configured to engage with a first card of the plurality of cards, the first card being a card positioned at a bottom of the plurality of the cards housed in the card housing section, and to feed out the first card to an outside of the card housing section;
a claw feed mechanism configured to move the feed-out claw;
a gate member configured to be formed with a gate through which the first card passes toward a front side, with a side of a direction of feeding out the first card by the feed-out claw as the front side, and a side opposite to the front side as a rear side; and
a gate moving mechanism configured to move the gate member in such a manner that the gate goes up and down,
wherein a front side opening configured to open in a front-rear direction is formed in a lower end of a front wall that constitutes a front surface portion of the card housing section,
wherein a lower side opening configured to open in an up and down direction is formed in a front end side of a housing section side bottom surface section that constitutes a lower surface portion of the card housing section,
wherein the gate member comprises a front surface section configured to be disposed at a front side of the front side opening and a gate member side bottom surface section configured to be disposed below the front surface section,
wherein the gate is formed between at least a part of a lower end surface of the front surface section and at least a part of a top surface of the gate member side bottom surface section,
wherein the gate member is structured such that, during standby before the first card is fed out to the outside of the card housing section, the gate member is at a retracted position at which the top surface of the gate member side bottom surface section is disposed below the top surface of the housing section side bottom surface section,
and wherein the gate member is structured such that, when the first card is fed out to the outside of the card housing section, the gate member moves until at least a part of the top surface of the gate member side bottom surface section passes through an upper end of the lower side opening, and a lower side surface of the gate is disposed above the top surface of the housing section side bottom surface section.

2. The card feed-out device according to claim 1, comprising a holding shaft configured to turnably hold a rear end side of the gate member below the housing section side bottom surface section and a biasing member configured to bias the gate member in a direction toward the retracted position, the direction toward the retracted position being a turning direction of the gate member centering around the holding shaft,
wherein the claw feed mechanism comprises a motor and a power transmission system configured to transmit power of the motor to the feed-out claw,
wherein the gate moving mechanism comprises a cam member configured to be turned by the power of the motor,
wherein a cam follower configured to come in contact with a cam surface formed in the cam member is attached to, or formed in, the gate member,
and wherein the gate member is structured such that, when the first card is fed out to the outside of the card housing section, the gate member interlocks with a movement of the feed-out claw, thereby turning centering around the holding shaft.

3. The card feed-out device according to claim 2,
wherein a convex section configured to protrude toward an upper side is formed in a front end side of the top surface of the housing section side bottom surface section,
wherein the gate member is structured such that, when the gate member is at the retracted position, an upper side surface of the gate is disposed below an upper end surface of the convex section, and wherein the gate member is structured such that, when the first card is fed out to the outside of the card housing section, the gate member moves until when the lower side surface of the gate is disposed above the upper end surface of the convex section.

4. The card feed-out device according to claim 3, wherein an engaging surface, configured to come in contact with a rear end of the first card and push the first card to the front side, and an inclined surface, configured to be inclined toward an upper side as getting closer to the rear side in a card feed-out state where the feed-out claw feeds out the first card, are formed in the feed-out claw, wherein the inclined surface is disposed more forward than the engaging surface in the card feed-out state, wherein when the engaging surface is in contact with the rear end of the first card, the rear end of the top surface of the first card is above an upper end of the engaging surface, and wherein the gate member is structured such that, when the card is fed out, after the inclined surface comes in contact with the rear end side of the first card, and the rear end side of the first card, that comes in contact with the inclined surface, rises up while sliding on the inclined surface, and the rear end of the top surface of the first card reaches substantially a same height as the upper end of the engaging surface, and before a front end of the first card, that is pushed by the engaging surface, reaches the gate, the gate member moves in such a manner that the lower side surface of the gate moves to reach above the upper end surface of the convex section.

5. The card feed-out device according to claim 4, wherein the engaging surface, configured to come in contact with a rear end of the first card and push the first card to the front side, and the inclined surface, configured to be inclined toward an upper side as getting closer to the rear side in a card feed-out state where the feed-out claw feeds out the first card, are formed in the feed-out claw, wherein the inclined surface is disposed more forward than the engaging surface in the card feed-out state, and wherein during standby before the first card is fed out to the outside of the card housing section, a gap is formed between the inclined surface and the first card.

6. The card feed-out device according to claim 5, wherein the engaging surface, configured to come in contact with a rear end of the first card and push the first card to the front side, is formed in the feed-out claw, wherein the feed-out claw rotatably holds a roller, wherein the roller is configured to rotate with a width direction of the card, is the width direction of the card being orthogonal to the front-rear direction and the up and down direction, as an axial direction of a rotation, and wherein in the card feed-out state where the feed-out claw feeds out the first card, the roller is disposed more rearward than the engaging surface, and an upper end of the roller is disposed above an upper end of the feed-out claw.

7. The card feed-out device according to claim 2, wherein an engaging surface, configured to come in contact with a rear end of the first card and push the first card to the front side, and an inclined surface, configured to be inclined toward an upper side as getting closer to the rear side in a card feed-out state where the feed-out claw feeds out the first card, are formed in the feed-out claw, wherein the inclined surface is disposed more forward than the engaging surface in the card feed-out state, and wherein during standby before the first card is fed out to the outside of the card housing section, a gap is formed between the inclined surface and the first card.

8. The card feed-out device according to 2, wherein an engaging surface, configured to come in contact with a rear end of the first card and push the first card to the front side, is formed in the feed-out claw, wherein the feed-out claw rotatably holds a roller, wherein the roller is configured to rotate with a width direction of the card, the width direction of the card being orthogonal to the front-rear direction and the up and down direction, as an axial direction of a rotation, and wherein in the card feed-out state where the feed-out claw feeds out the first card, the roller is disposed more rearward than the engaging surface, and an upper end of the roller is disposed above an upper end of the feed-out claw.

9. The card feed-out device according to claim 3, wherein an engaging surface, configured to come in contact with a rear end of the first card and push the first card to the front side, and an inclined surface, configured to be inclined toward an upper side as getting closer to the rear side in a card feed-out state where the feed-out claw feeds out the first card, are formed in the feed-out claw, wherein the inclined surface is disposed more forward than the engaging surface in the card feed-out state, and wherein during standby before the first card is fed out to the outside of the card housing section, a gap is formed between the inclined surface and the first card.

10. The card feed-out device according to claim 3, wherein an engaging surface, configured to come in contact with a rear end of the first card and push the first card to the front side, is formed in the feed-out claw, wherein the feed-out claw rotatably holds a roller, wherein the roller is configured to rotate with a width direction of the card, the width direction of the card being orthogonal to the front-rear direction and the up and down direction, as an axial direction of a rotation, and wherein in the card feed-out state where the feed-out claw feeds out the first card, the roller is disposed more rearward than the engaging surface, and an upper end of the roller is disposed above an upper end of the feed-out claw.

11. The card feed-out device according to claim 4, wherein the engaging surface, configured to come in contact with a rear end of the first card and push the first card to the front side, is formed in the feed-out claw, wherein the feed-out claw rotatably holds a roller, wherein the roller is configured to rotate with a width direction of the card, the width direction of the card being orthogonal to the front-rear direction and the up and down direction, as an axial direction of a rotation, and wherein in the card feed-out state where the feed-out claw feeds out the first card, the roller is disposed more rearward than the engaging surface, and an upper end of the roller is disposed above an upper end of the feed-out claw.

12. The card feed-out device according to claim 1, wherein a convex section configured to protrude toward an upper side is formed in a front end side of the top surface of the housing section side bottom surface section, wherein the gate member is structured such that, when the gate member is at the retracted position, an upper side surface of the gate is disposed below an upper end surface of the convex section, and wherein the gate member is structured such that, when the first card is fed out to the outside of the card housing section, the gate member moves until when the lower side surface of the gate is disposed above the upper end surface of the convex section.

13. The card feed-out device according to claim 12, wherein an engaging surface, configured to come in contact with a rear end of the first card and push the first card to the front side, and an inclined surface, configured to be inclined toward an upper side as getting closer to the rear side in a card feed-out state where the feed-out claw feeds out the first card, are formed in the feed-out claw, wherein the inclined surface is disposed more forward than the engaging surface in the card feed-out state, wherein when the engaging surface is in contact with the rear end of the first card, the rear end of the top surface of the first card is above an upper end of the engaging surface, wherein the gate member is structured such that, when the card is fed out, after the inclined surface comes in contact with the rear end side of the first card, and the rear end side of the first card, that comes in contact with the inclined surface, rises up while sliding on the inclined surface, and the rear end of the top surface of the first card reaches substantially a same height as the upper end of the engaging surface, and before a front end of the first card, that is pushed by the engaging surface, reaches the gate, the gate member moves in such a manner that the lower side surface of the gate moves to reach above the upper end surface of the convex section.

14. The card feed-out device according to claim 13, wherein the engaging surface, configured to come in contact with a rear end of the first card and push the first card to the front side, and the inclined surface, configured to be inclined toward an upper side as getting closer to the rear side in a card feed-out state where the feed-out claw feeds out the first card, are formed in the feed-out claw, wherein the inclined surface is disposed more forward than the engaging surface in the card feed-out state, and wherein during standby before the first card is fed out to the outside of the card housing section, a gap is formed between the inclined surface and the first card.

15. The card feed-out device according to claim 14, wherein the engaging surface, configured to come in contact with a rear end of the first card and push the first card to the front side, is formed in the feed-out claw, wherein the feed-out claw rotatably holds a roller, wherein the roller is configured to rotate with a width direction of the card, the width direction of the card being orthogonal to the front-rear direction and the up and down direction, as an axial direction of a rotation, and wherein in the card feed-out state where the feed-out claw feeds out the first card, the roller is disposed more rearward than the engaging surface, and an upper end of the roller is disposed above an upper end of the feed-out claw.

16. The card feed-out device according to claim 12, wherein an engaging surface, configured to come in contact with a rear end of the first card and push the first card to the front side, and an inclined surface configured to be inclined toward an upper side as getting closer to the rear side in a card feed-out state where the feed-out claw feeds out the first card, are formed in the feed-out claw, wherein the inclined surface is disposed more forward than the engaging surface in the card feed-out state, and wherein during standby before the first card is fed out to the outside of the card housing section, a gap is formed between the inclined surface and the first card.

17. The card feed-out device according to claim 12, wherein an engaging surface, configured to come in contact with a rear end of the first card and push the first card to the front side, is formed in the feed-out claw, wherein the feed-out claw rotatably holds a roller, wherein the roller is configured rotate with a width direction of the card, the width direction of the card being orthogonal to the front-rear direction and the up and down direction, as an axial direction of a rotation, and wherein in the card feed-out state where the feed-out claw feeds out the first card, the roller is disposed more rearward than the engaging surface, and an upper end of the roller is disposed above an upper end of the feed-out claw.

18. The card feed-out device according to claim 13, wherein the engaging surface, configured to come in contact with a rear end of the first card and push the first card to the front side, is formed in the feed-out claw, wherein the feed-out claw rotatably holds a roller, wherein the roller is configured to rotate with a width direction of the card, the width direction of the card being orthogonal to the front-rear direction and the up and down direction, as an axial direction of a rotation, and wherein in the card feed-out state where the feed-out claw feeds out the first card, the roller is disposed more rearward than the engaging surface, and an upper end of the roller is disposed above an upper end of the feed-out claw.

19. The card feed-out device according to claim 1, wherein an engaging surface, configured to come in contact with a rear end of the first card and push the first card to the front side, and an inclined surface, configured to be inclined toward an upper side as getting closer to the rear side in a card feed-out state where the feed-out claw feeds out the first card, are formed in the feed-out claw, wherein the inclined surface is disposed more forward than the engaging surface in the card feed-out state, and wherein during standby before the first card is fed out to the outside of the card housing section, a gap is formed between the inclined surface and the first card.

20. The card feed-out device according to claim 1, wherein an engaging surface, configured to come in contact with a rear end of the first card and push the first card to the front side, is formed in the feed-out claw, wherein the feed-out claw rotatably holds a roller, wherein the roller is configured to rotate with a width direction of the card, the width direction of the card being orthogonal to the front-rear direction and the up and down direction, as an axial direction of a rotation, and wherein in the card feed-out state where the feed-out claw feeds out the first card, the roller is disposed more rearward than the engaging surface, and an upper end of the roller is disposed above an upper end of the feed-out claw.

* * * * *